United States Patent [19]

Dufour

[11] 4,031,865

[45] June 28, 1977

[54] HYDROGEN-OXYGEN FUEL CELL FOR USE WITH INTERNAL COMBUSTION ENGINES

[76] Inventor: Patrick Dufour, 14 Hawthorne St., Laconia, N.H. 03246

[22] Filed: Oct. 1, 1975

[21] Appl. No.: 618,442

[52] U.S. Cl. .................................. 123/1 A; 123/3; 123/DIG. 12
[51] Int. Cl.² ........................................ F02B 43/08
[58] Field of Search .... 123/1 A, 3, 119 E, DIG. 12; 204/129

[56] References Cited

UNITED STATES PATENTS

| 1,262,034 | 4/1918 | Frazer | 123/DIG. 12 |
| 1,876,879 | 9/1932 | Drabold | 123/DIG. 12 |
| 2,140,254 | 12/1938 | Zavka | 123/3 X |
| 2,742,886 | 4/1956 | McPherson | 123/3 X |
| 3,458,412 | 7/1969 | Shinagawa et al. | 204/129 |
| 3,648,668 | 3/1972 | Pacheco | 123/1 A X |
| 3,939,806 | 2/1976 | Bradley | 123/DIG. 12 |

FOREIGN PATENTS OR APPLICATIONS 221,887  6/1942  Sweden ................... 123/3

Primary Examiner—C. J. Husar
Assistant Examiner—Craig R. Feinberg

[57] ABSTRACT

A fuel cell for generating a hydrogen and oxygen gas utilizing a water electrolyte and a catalyst selected from the group consisting of sodium hydroxide and potassium carbonate. The fuel cell includes a pair of electrodes connected in circuit with an electrical power supply and an outlet for directing the generated hydrogen and oxygen to a drier where it is dried and mixed to form a combustible fuel mixture. The fuel mixture is then directed in accordance to engine demand to the intake manifold of an internal combustion engine as a fuel supplement.

1 Claim, 1 Drawing Figure

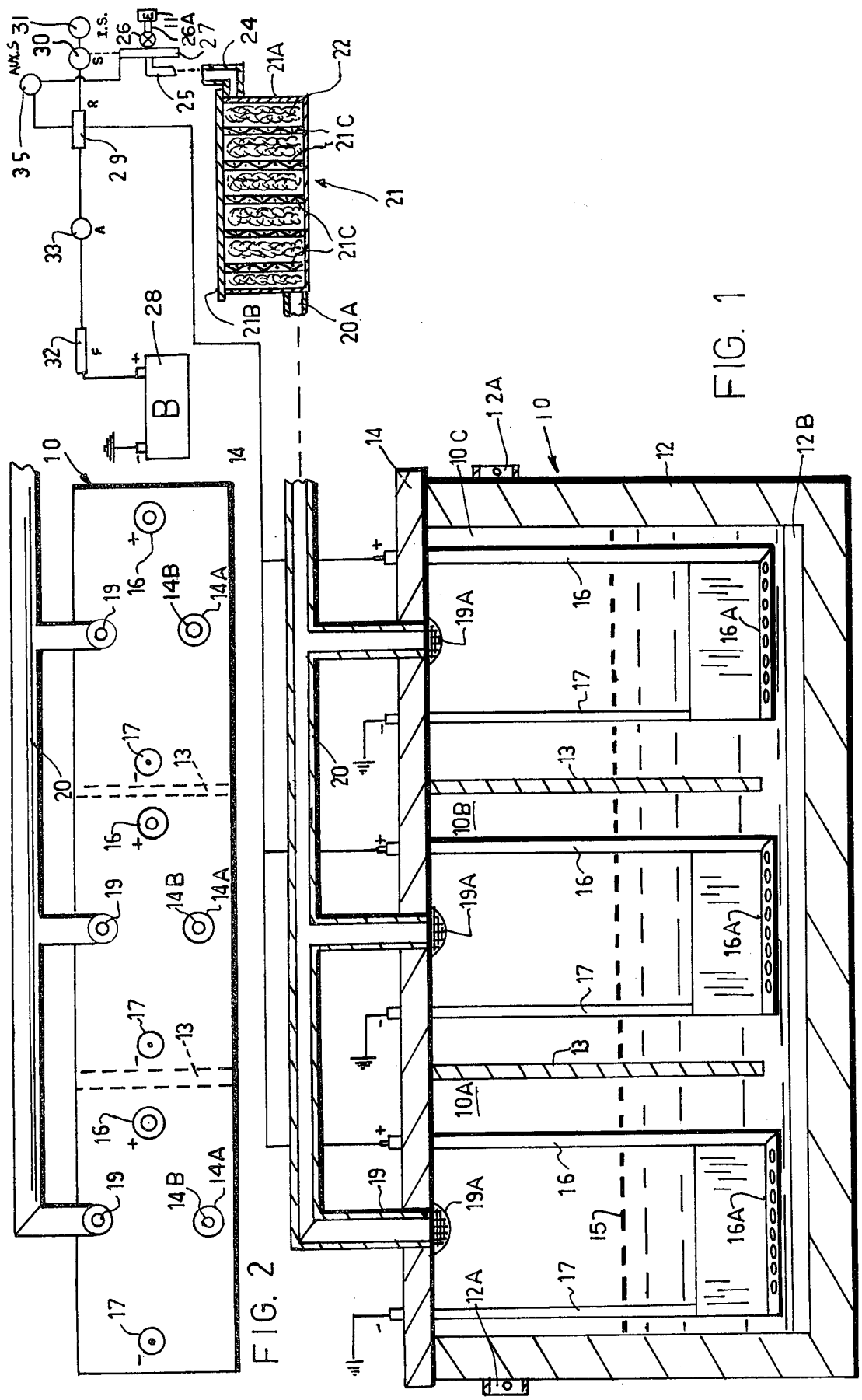

HYDROGEN-OXYGEN FUEL CELL FOR USE WITH INTERNAL COMBUSTION ENGINES

PROBLEM AND PRIOR ART

Heretofore, numerous efforts have been made to increase the mileage attainable from a gallon of gasoline, when such is used as a fuel for an internal combustion engine, e.g., in an automobile. The prior known effects comprised of utilizing various types of additives to the fuel prior to burning. Other efforts comprised of employing various devices for improving ignition and/or timing of the engine so as to achieve maximum efficiency. Other efforts have comprised of utilizing alternate or supplemental fuel. While various efforts have been disclosed in various publications for utilizing hydrogen gas as a fuel for internal combustion engines, it is not known whether any of such efforts have in fact been reduced to actual practice by others.

OBJECTS

It is an object of this invention to provide a method and apparatus whereby hydrogen and oxygen can be generated by electrolysis from water containing a catalyst and whereby the generated gases can be mixed to form a combustible fuel mixture for use as a supplemental fuel in operating an internal combustion engine.

Another object is to provide a fuel cell for generating hydrogen and oxygen for use as a fuel for operating an internal combustion engine.

Another object is to provide a hydrogen generator or fuel cell wherein the amount of gases generated is proportional to engine demand.

BRIEF SUMMARY OF INVENTION

The foregoing objects and other features and advantages of the invention as attained by generating by electrolysis of water a hydrogen and oxygen gas which are mixed to form a combustible mixture which is then fed to the intake manifold of an internal combustion engine which is operating on conventional fuels, in accordance with engine demand. This is attained by a hydrogen generator having one or more fuel cells. Each fuel cell includes a pair of electrodes extending into a water electrolyte having a catalyst, e.g., sodium hydroxide, dispersed therein. When utilized in a vehicle, the electrodes of the fuel cell are connected in circuit to the power supply of the vehicle. The generated gases are directed from the fuel cell to a dryer where the gases are dried and mixed to form a combustible fuel mixture. The fuel mixture is thereafter directed to the intake manifold of an internal combustion engine as a fuel supplement.

IN THE DRAWINGS

FIG. 1 illustrates a fuel cell embodying the present invention and schematically shown as utilized in a vehicle.

FIG. 2 is a plan view of the fuel cell of FIG. 1.

DETAILED DESCRIPTION

This invention is directed to a method of generating and supplying hydrogen gas as a fuel supplement to an internal combustion engine, and an improved hydrogen generator or fuel cell for generating the hydrogen gas. By supplementing the burning of a conventional fuel with hydrogen, the internal combustion engine in operation is capable of producing more work. The method comprises of generating, by electrolysis of water, a hydrogen and oxygen gas. To enhance the electrolysis, a catalyst, e.g., sodium hydroxide or potassium carbonate is added to the water electrolyte. The hydrogen and oxygen so produced is dried and mixed to form a fuel mixture which is then fed to the intake manifold of an internal combustion engine. The rate of generation of the hydrogen and oxygen gas is controlled in accordance with engine demand.

Referring to the drawings, there is shown the improved hydrogen generator 10 for generating hydrogen and oxygen gas for use in a vehicle powered by an internal combustion engine 11, e.g., a gasoline engine, diesel or the like. It will be understood that the engine 11 comprises a conventional internal combustion engine utilizing ordinary gasoline as an operating fuel if it be a gas engine, or diesel oil if it is is an diesel.

As shown, the hydrogen generator or fuel cell 10 includes a housing 12 having one or more partitions 13 to define a multi-chamber fuel cell 10. It will be understood that the fuel cell 10 may be constructed to have one or more cell chambers. The illustrated hydrogen generator or fuel cell 10 is thus shown as having three fuel cell chambers 10A, 10B, and 10C. The upper end of the fuel cell housing 12 is closed for a cover or closure 14. Mounting plates 12A are connected to the housing 12 for providing a means for clamping the hydrogen generator 10 to the frame structure of a vehicle.

Formed in the cover 14 to communicate with the respective chambers 10A, 10B and 10C is an inlet 14A closed by a filler cap 14B through which the respective chambers can be charged with an electrolyte. The filler cap 14B has a valve in it to compensate for any excess vacuum which is created when the engine in running.

In accordance with this invention the electrolyte comprises water 15. A catalyst is dispersed in the water 15. The catalyst comprises sodium hydroxide or potassium carbonate.

As shown in FIG. 1, the partitions 13 are spaced from the bottom of the housing so that the respective chambers 10A, 10B, 10C are in communication with one another. Also the bottom of the housing 12 is formed with ribs 12B running longitudinally of the housing 10. The ribs 12B thus enhance the flow of electrolyte from one chamber to the other. The arrangement is such that sediment chambers are formed at the bottom of the housing 12.

Extending into the electrolyte reservoir of the respective cell chambers 10A, 10B, 10C are a positive and negative electrode 16 and 17 respectively. The arrangement is such that when the electrodes are energized, the hydrogen and oxygen in its respective gaseous form is liberated. The positive electrode is also defined as an air tube which is perforated along the lower end 16A whereby the air causes agitation sufficient to stir or liberate the hydrogen forming at the electrode.

Extending through the cover 14 over each of the cell chambers 10A, 10B and 10C is a gas outlet 19 which connects with conduit 20 whereby the oxygen and hydrogen gases generated are directed to a dryer 21. A screen 19A is extended across the inlet 19 to prohibit foreign matter from entering conduit 20. As shown, the dryer 21 comprises a housing 21A and a cover 21B. Disposed in the housing of the dryer are a series of spaced copper screens 21C and a filter insert 22 is disposed between the screen 21C within the dryer to effect a drying of the generated gases. Such filtering inserts may comprise steel wood, fiber glass, asbestos fiber, mica chips and the like.

In passing through the dryer, the moisture contained in the gases generated is separated therefrom. As shown in FIG. 1 the dryer is a separate unit connected by a conduit or hose 20A to the outlet 20 of the hydrogen generator 10 and it is located at a higher elevation relative to fuel cell 10.

The outlet 24 of dryer 21 connects by a conduit 25 to the inlet end of a control valve 26. The outlet 26A of the valve is connected to the intake manifold of the engine 11.

An actuator 27, e.g., an accelerator of a vehicle is operatively connected to the control valve 26 so that the latter is rendered responsive to the movement of the accelerator 27. The arrangement is such that the amount of gases introduced to the intake manifold of the engine is rendered proportional to engine demand or speed.

As best seen in FIG. 1, the negative electrode 17 as is the negative electrode of a battery 28 is grounded. The electrical circuit includes a relay 29 which when actuated controls a rheostat switch 30 to control the rate at which the gases are generated in the fuel cell 10. As seen in FIG. 1, the accelerator is connected to the rheostat switch 30 by a linkage so that as the engine speeds up and requires more fuel, more gases will be generated. The relay 29 in turn is also wired in circuit to an ignition switch 31. The usual fuse 32 and ammeter 33 is wired in circuit with the relay 29. An auxilary switch with 35 light is in circuit between the accelerator 27 and the relay.

In operation, it will be noted that when the ignition switch 31 is closed the engine 11 can be started in the conventional manner. That is, gasoline is fed to a carburetor where it is mixed with air and the gas mixture fed to the respective cylinders where it is fired. With the fuel cell 10 connected in circuit as seen in FIG. 1, the actuation of the accelerator causes the fuel cell to generate hydrogen and oxygen gases which are then passed to a dryer 21 and then to the control valve 26 to the intake manifold of the engine. The hydrogen thus fed to the cylinder of the engine mixes with the conventional fuel thereby enhancing the energy level of the fuel by the amount of energy contained in the hydrogen gases. With the hydrogen supplement it has been discovered that the miles attainable by an automobile engine per gallon of gas is considerably enhanced.

While the invention has been described with reference to an automobile engine, the principle can be applied to a stationary engine, diesel engine and in general to any type of internal combustion engine, and irrespective of the fuel customary for operating such engine.

As the invention has been described with respect to a particular embodiment and method, it will be understood and appreciated that variations and modifications may be made without departing from the spirit or scope of the invention.

What is claimed is:

1. In combination, an internal combustion engine having an intake manifold,
    and a carburetor for supplying a fuel-air mixture to said engine,
    a hydrogen and oxygen gas generator for supplying a hydrogen gas fuel supplement to said engine,
    said gas generator comprising a cell containing water,
    a negative and positive electrode extending into said water,
    a catalyst of an alkaline base dispersed in said water,
    an electrical D.C. power supply connected in circuit with said electrodes whereby hydrogen gas is generated when said electrodes are energized,
    a rheostat switch in circuit with said power supply to control the rate of said hydrogen gas generator,
    a dryer,
    conduit means connecting the gases generated in said cell to said dryer,
    means for directing the gases dried in said dryer to said intake manifold,
    and accelerator means operatively connected to said rheostat switch for controlling the rate of gas generation in accordance to engine demand,
    and wherein said positive electrode is perforated to permit the introduction of air into said cell to enhance liberation of the hydrogen gas forming at the negative electrode.

* * * * *